United States Patent
Kuribayashi

(10) Patent No.: US 8,081,363 B2
(45) Date of Patent: Dec. 20, 2011

(54) OPTICAL BEAM SCANNING APPARATUS AND IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 659 days.

(21) Appl. No.: 12/113,894

(22) Filed: May 1, 2008

(65) Prior Publication Data
US 2009/0051994 A1 Feb. 26, 2009

Related U.S. Application Data

(60) Provisional application No. 60/957,698, filed on Aug. 23, 2007.

(51) Int. Cl.
*G02B 26/08* (2006.01)
(52) U.S. Cl. .................. 359/207.9; 250/559.29
(58) Field of Classification Search ............... 359/201.1, 359/205.1–207.6, 207.7, 207.8, 222.1, 208.1–208.2, 359/196.1–226.3, 290–295, 833–834, 838, 359/846, 871, 872; 250/204, 559.06, 559.29, 250/230, 234–236; 347/243, 255–260; 353/39, 353/98–99; 385/15–18, 22; 398/12, 19, 398/45; 358/474, 493–494
See application file for complete search history.

(56) References Cited

U.S. PATENT DOCUMENTS 6,831,764 B2 * 12/2004 Shimomura et al. ....... 359/207.1
2006/0187513 A1 * 8/2006 Ohsugi ..................... 359/212

FOREIGN PATENT DOCUMENTS

| JP | H06-003610 | | 1/1994 |
| JP | 06-003610 | * | 6/1994 |
| JP | H09-101471 | | 4/1997 |
| JP | H09-203872 | | 8/1997 |
| JP | H09-243941 | | 9/1997 |

* cited by examiner

*Primary Examiner* — Jennifer L. Doak
(74) *Attorney, Agent, or Firm* — Patterson & Sheridan, LLP

(57) ABSTRACT

An optical beam scanning apparatus and an image forming apparatus having the optical beam scanning apparatus are provided. The optical beam scanning apparatus includes a light source; a pre-deflection optical system; an optical beam deflecting device; a sensor; and a post-deflection optical system. An exit surface of the imaging lens includes a lens-shaped portion for imaging the light flux on a scanned surface of the scanned object, and a totally reflecting surface-shaped portion having a totally reflecting surface for totally reflecting a portion of the light flux from the deflecting surface of the optical beam deflecting device at least two times, and the incident surface of the imaging lens includes a transmission surface-shaped portion having a transmission surface for transmitting the light flux totally reflected by the totally reflecting surface, and the light flux transmitted through the transmission surface is directed to the sensor.

15 Claims, 12 Drawing Sheets

OPTICAL BEAM SCANNING APPARATUS AND IMAGE FORMING APPARATUS

BACKGROUND OF THE INVENTION

1. Technical Field of the Invention

The present invention relates to an optical beam scanning apparatus and an image forming apparatus equipped with the optical beam scanning apparatus, and more particularly, to an optical beam scanning apparatus with a compact optical system to direct a light flux, which is reflected on a deflecting surface of a polygon mirror, to a horizontal synchronization sensor, and an image forming apparatus equipped with the optical beam scanning apparatus.

2. Description of the Related Art

Image forming apparatuses employing an electrophotographic method, such as a laser printer, a digital copying machine, a laser facsimile machine and so on, each have an optical beam scanning apparatus for forming an electrostatic latent image on a photoconductive drum by irradiating and scanning a surface of the photoconductive drum with a laser beam (light beam).

In recent years, a tandem color apparatus has been proposed in addition to a monochrome apparatus equipped with a scanning optical system using a single light source, and in addition, a method for use in the tandem color apparatus has been proposed, which increases the number of laser beams to be scanned one time using a plurality of light sources (laser diodes) arranged in a single laser unit for the purpose of increasing the scan speed on a surface of a photoconductive drum (multi-beam method). In the multi-beam method, a plurality of beams for each of color components (for example, yellow, magenta, cyan and black) emitted from each light source are processed to be combined into a single integrated beam in an pre-deflection optical system, and then the single integrated beam is incident on a polygon mirror. The polygon mirror deflects the incident beam which in turn passes through an fθ lens constituting an post-deflection optical system to be separated into beams for respective color components to be irradiated on respective photoconductive drums corresponding to the respective color components.

In the prior art, for example, in a monochrome apparatus using a single beam, a portion of light flux reflected on a deflection surface of a polygon mirror is used as a horizontal synchronization adjusting signal in the order to align a recording position of a scan optical system (that is, in the order to take a horizontal synchronization). For this reason, a horizontal synchronization sensor for detecting the horizontal synchronization adjusting signal is required to be arranged at a position corresponding to a position of an image plane of a photoconductive drum in the vicinity of the photoconductive drum. However, the arrangement of the horizontal synchronization sensor at such a position may increase the unit size. Accordingly, in the order to provide a compact unit in which the horizontal synchronization sensor is arranged, a horizontal synchronization reflecting mirror is arranged in the middle of an optical path when a portion of light flux reflected on the deflection surface of the polygon mirror is directed to the horizontal synchronization sensor.

In addition, in case of using a multi-beam method, in the order to align a recording position of a scan optical system, an fθ characteristic and a beam diameter on a horizontal synchronization sensor are additionally required to be equal to fθ characteristic and a beam diameter on an image plane of a photoconductive drum, respectively.

In this connection, the following related technique has been known as a technique for directing a portion of light flux reflected on a deflection surface of a polygon mirror to a horizontal synchronization sensor. JP-A-6-3610 discloses a technique for totally reflecting a light flux from a polygon mirror and directing the reflected light flux to a horizontal synchronization sensor to detect an image recording position by means of, for example, a prism integrated with an fθ leans. According to the technique disclosed in JP-A-6-3610, it is possible to provide a compact scan optical system with reduced costs, which deflects a light flux for a horizontal synchronization sensor.

In addition, JP-A-5-134197 discloses a technique in which a synchronization detection lens for imaging a light beam to a horizontal synchronization sensor is formed to be integrated with a portion of a scan lens. According to the technique disclosed in JP-A-5-134197, it is possible to eliminate a dedicated synchronization detection lens for imaging a scanning light beam to a horizontal synchronization sensor for synchronization detection, thereby achieving cost-cutting and reduction of power consumption for attachment operation.

In addition, JP-A-9-203872 discloses a technique in which an optical path bending part, which is an optical scanning lens constituting at least part of a scanning image forming lens and reflects a synchronizing light on an end part of a scanning start side of a deflected light flux in a main scanning corresponding direction, is constituted so as to bend the optical path so that the reflected synchronizing light passes through the lens in the main scanning corresponding direction. According to the technique disclosed in JP-A-9-203872, it is possible to greatly increase the degree of freedom of design of the optical scanning device by making it possible to use a completely new layout for a synchronizing light detecting element of the optical scanning device.

In addition, JP-A-9-243941 discloses a technique in which a mirror part is integrally formed with a portion of a lens for focusing a laser beam to be imaged on a photoconductor, and the laser beam is reflected by the mirror part and is incident on a photodiode. According to the technique disclosed in JP-A-9-243941, it is possible to reduce the number of parts related to an optical system, to reduce costs of parts and assembly costs, and to further improve reliability of an optical device.

In addition, JP-A-9-101471 discloses a technique in which a lens constituting a scanning image forming lens is provided with a reflection part at a part which does not contribute to optical scanning on a scanned surface on the side of the scanned surface at an end part where a deflected light flux is received in a deflecting direction. According to the technique disclosed in JP-A-9-101471, it is possible to compactly arrange an optical system which includes a light receiving element for detecting synchronized light.

However, although the techniques disclosed in JP-A-6-3610 and JP-A-5-134197 may be applied to a single beam, they are difficult to be applied to a multi-beam (in the case of an optical system using a light source having a plurality of emission points) since an fθ characteristic and a beam diameter on a horizontal synchronization sensor are not equal to an fθ characteristic and a beam diameter on an image plane of a photoconductive drum, respectively. In addition, even if the fθ characteristic and the beam diameter on the horizontal synchronization sensor are equal to the fθ characteristic and the beam diameter on the image plane of the photoconductive drum, respectively, the technique disclosed in JP-A-6-3610 cannot avoid increase in the size of a unit since the number of times the light flux reflected on the deflecting surface of the polygon mirror is totally reflected by the prism integrated with the fθ lens or a synchronization detecting lens is one.

The technique disclosed in JP-A-9-203872 cannot decide a position at an incident surface since this technique has the configuration where the light beam is incident on a flange part at the side of the incident surface. In addition, this technique is disadvantageous in manufacturing cost since both end surfaces in a lens longitudinal direction are taken as optical surfaces and accordingly a gate through which resin for molding is flown out is required to be arranged at a different position.

The technique disclosed in JP-A-9-243941 incurs high manufacturing costs of an optical scanning apparatus since a reflecting surface has to be subjected to a vacuum evaporation processing (of metal). The technique disclosed in JP-A-9-101471 has a disadvantage in that a height in a sub-scanning direction in an optical system in which a plurality of light fluxes are passed with different heights in the sub-scanning direction increases although two totally reflecting surfaces are arranged in the sub-scanning direction.

SUMMARY OF THE INVENTION

In light of the above circumstances, an object of the present invention is to provide an optical beam scanning apparatus with a compact optical system at preferably reduced costs to direct a light flux, which is reflected on a deflecting surface of a polygon mirror, to a horizontal synchronization sensor, and an image forming apparatus equipped with the optical beam scanning apparatus.

To achieve the above object, according to an aspect of the invention, there is provided an optical beam scanning apparatus including: a light source configured to emit one or plural light fluxes; a pre-deflection optical system configured to give a predetermined characteristic to the light flux emitted from the light source; an optical beam deflecting device configured to deflect the light flux, which is given with the predetermined characteristic by the pre-deflection optical system, to an scanned object by means of reflection in a main scanning direction; a sensor configured to detect a portion of the light flux deflected by the optical beam deflecting device; and a post-deflection optical system configured to include an imaging lens for imaging the light flux, which is deflected by the optical beam deflecting device, on the scanned object. An exit surface of the imaging lens includes a lens-shaped portion for imaging the light flux from a deflecting surface of the optical beam deflecting device, which passed through an incident surface of the imaging lens, on a scanned surface of the scanned object, and a totally reflecting surface-shaped portion having a totally reflecting surface for totally reflecting a portion of the light flux from the deflecting surface of the optical beam deflecting device, which passed through an incident surface of the imaging lens, at least two times, and the imaging lens includes a transmission surface-shaped portion having a transmission surface for transmitting the light flux totally reflected by the totally reflecting surface, and the light flux transmitted through the transmission surface is directed to the sensor.

According to another aspect of the invention, there is provided an image forming apparatus having an optical beam scanning apparatus including: a light source configured to emit one or plural light fluxes; a pre-deflection optical system configured to give a predetermined characteristic to the light flux emitted from the light source; an optical beam deflecting device configured to deflect the light flux, which is given with the predetermined characteristic by the pre-deflection optical system, to an scanned object by means of reflection in a main scanning direction; a sensor configured to detect a portion of the light flux deflected by the optical beam deflecting device; and a post-deflection optical system configured to include an imaging lens for imaging the light flux, which is deflected by the optical beam deflecting device, on the scanned object. An exit surface of the imaging lens includes a lens-shaped portion for imaging the light flux from a deflecting surface of the optical beam deflecting device, which passed through an incident surface of the imaging lens, on a scanned surface of the scanned object, and a totally reflecting surface-shaped portion having a totally reflecting surface for totally reflecting a portion of the light flux from the deflecting surface of the optical beam deflecting device, which passed through an incident surface of the imaging lens, at least two times, and the imaging lens includes a transmission surface-shaped portion having a transmission surface for transmitting the light flux totally reflected by the totally reflecting surface, and the light flux transmitted through the transmission surface is directed to the sensor.

DETAILED DESCRIPTION OF EMBODIMENTS

Hereinafter, embodiments of the present invention will be described with reference to the accompanying drawings.

Figure 1:
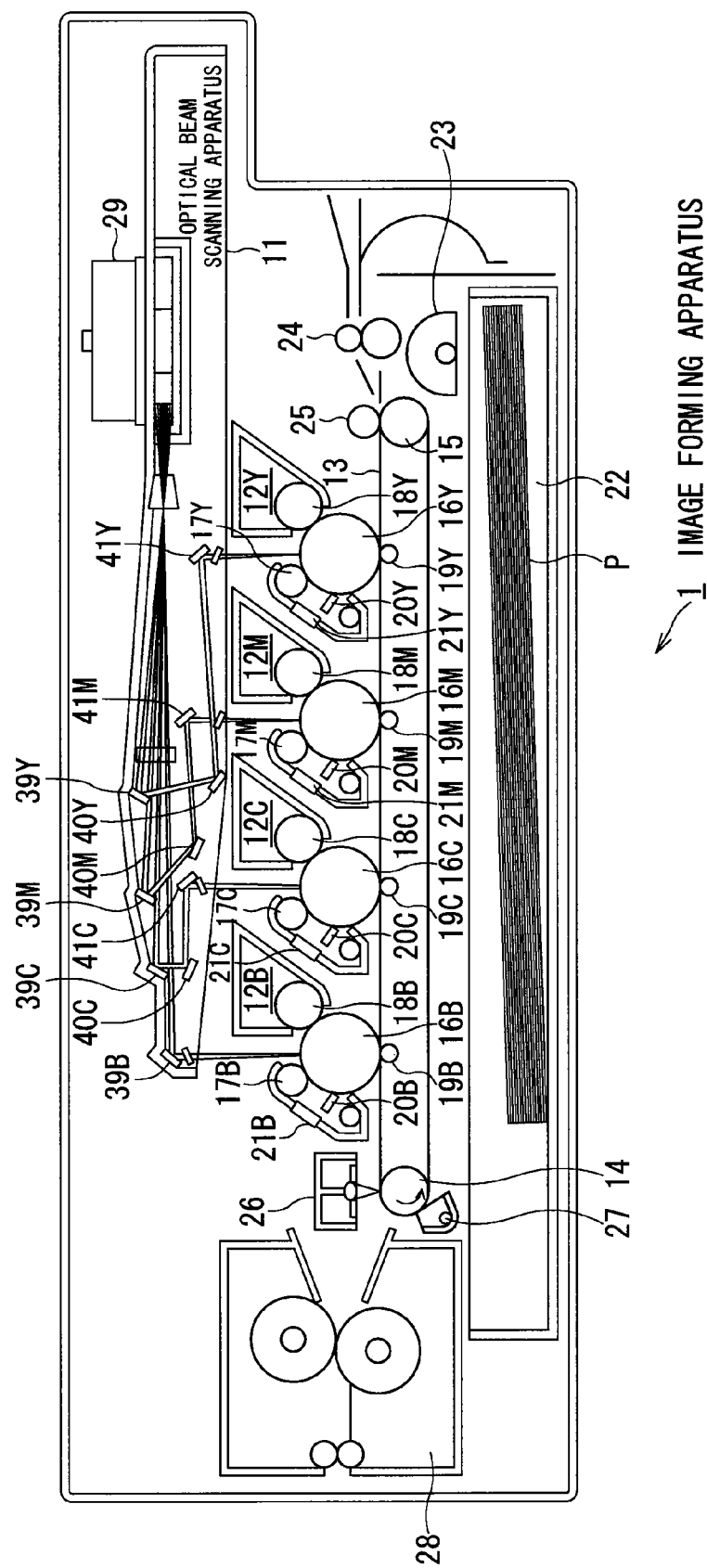
FIG. 1 is a side view showing a configuration of an image forming apparatus equipped with an optical beam scanning apparatus to which the present invention is applied.

FIG. 1 shows a configuration of an image forming apparatus 1 equipped with an optical beam scanning apparatus 11 to which the present invention is applied. Although the present invention may be applied not only to a monochrome apparatus equipped with a scanning optical system using a single light source but also to a tandem color apparatus using a multi-beam method, only the tandem color apparatus using the multi-beam method will be described with reference to FIG. 1 for the purpose of brevity of explanation.

Since the image forming apparatus 1 typically uses four kinds of image data separated for respective color component of Y (yellow), M (magenta), C (cyan) and B (black), and four sets of devices for forming an image for color component corresponding to each of Y, M, C and B, it identifies the image data for respective color components and the devices corresponding to respective color components by adding Y, M, C and B.

As shown in FIG. 1, the image forming apparatus 1 has first to fourth image forming parts 12Y, 12M, 12C and 12B for forming an image for each separated color component.

The image forming parts 12 (12Y, 12M, 12C and 12B) are arranged in this order below the optical beam scanning apparatus 11 corresponding to each of positions at which laser beams L (LY, LM, LC and LB) for respective color components are emitted by a first post-deflection reflecting mirror 39B and third post-deflection reflecting mirrors 41Y, 41M and 41C of the optical beam scanning apparatus 11.

A carrying belt 13 for carrying a recording sheet P on which images formed through the respective image forming parts 12 (12Y, 12M, 12C and 12B) are transferred is arranged below the image forming parts 12 (12Y, 12M, 12C and 12B).

The carrying belt 13 is laid across a belt driving roller 14, which is rotated in a direction indicated by an arrow by a motor (not shown), and a tension roller 15, and is rotated at a predetermined speed in the rotation direction of the belt driving roller 14.

The image forming parts 12 (12Y, 12M, 12C and 12B) have respective photoconductive drums 16Y, 16M, 16C and 16B which have a cylindrical shape rotatable in a direction indicated by an arrow and on which electrostatic latent images corresponding to images exposed to light by the optical beam scanning apparatus 11 are formed. These photoconductive drums 16 are defined as "scanned object".

Around the photoconductive drums 16 (16Y, 16M, 16C and 16B), electrifying devices 17 (17Y, 17M, 17C and 17B) for providing a predetermined potential to surfaces of the photoconductive drums 16 (16Y, 16M, 16C and 16B), developing devices 18 (18Y, 18M, 18C and 18B) for developing the electrostatic latent images formed on the surfaces of the photoconductive drums 16 (16Y, 16M, 16C and 16B) by supplying toner given with colors corresponding to the electrostatic latent images, transferring devices 19 (19Y, 19M, 19C and 19B) for transferring toner images of the photoconductive drums 16 (16Y, 16M, 16C and 16B) onto a recording medium, that is., the recording sheet P, carried by the carrying belt 13, cleaners 20 (20Y, 20M, 20C and 20B) for removing toner remaining on the photoconductive drums 16 (16Y, 16M, 16C and 16B), and neutralizing devices 21 (21Y, 21M, 21C and 21B) for eliminating a potential remaining on the photoconductive drums 16 (16Y, 16M, 16C and 16B) after transfer of the toner images are arranged in the order along a rotation direction of the photoconductive drums 16 (16Y, 16M, 16C and 16B).

The transferring devices 19 (19Y, 19M, 19C and 19B) face the photoconductive drums 16 (16Y, 16M, 16C and 16B) from the rear side of the carrying belt 13 with the carrying belt 13 interposed between the transferring devices 19 (19Y, 19M, 19C and 19B) and the photoconductive drums 16 (16Y, 16M, 16C and 16B).

A sheet cassette 22 for accommodating recording sheets P to be transferred with images formed by the image forming parts 12 (12Y, 12M, 12C and 12B) is arranged below the carrying belt 13. In addition, the cleaners 20 (20Y, 20M, 20C and 20B) remove the toner remaining on the photoconductive drums 16 (16Y, 16M, 16C and 16B), which was not transferred in the transfer of the toner images onto the recording sheet P by the transferring devices 19 (19Y, 19M, 19C and 19B).

A crescent-shaped feeding roller 23 for drawing out the recording sheets P accommodated in the sheet cassette 22, one by one, from the top of the sheet cassette 22 is arranged at one end of the sheet cassette 22 and near the tension roller 15.

A registration roller 24 for registering a lead end of one recording sheet P drawn out of the cassette 22 with a leading end of a toner image formed on the photoconductive drums 16B of the image forming part 12B (black) is disposed between the feeding roller 23 and the tension roller 15.

An absorption roller 25 for providing a predetermined electrostatic absorbing force to one recording sheet P carried by the registration roller 24 at a predetermined timing is disposed near the tension roller 15 between the registration roller 24 and the first image forming part 12Y and at a position which is substantially opposite to an outer side of the carrying belt 13 and corresponds to a position at which the tension roller 15 contacts the carrying belt 13.

A first registration sensor 26a and a second registration sensor 26b for detecting positions of images formed on the carrying belt 13 or images transferred onto the recording sheets P are disposed at one end of the carrying belt 13, near the belt driving roller 14 and on the outer side of the carrying belt 13 substantially contacting the belt driving roller 14, with a predetermined distance between both sensors in an axial direction of the belt driving roller 14 (since FIG. 1 is a front sectional view, the first registration sensor 26a located in front of a face of paper is not seen).

A carrying belt cleaner 27 for removing toner attached to the carrying belt 13 or small fragments of the recording sheets P is disposed on the outer side of the carrying belt 13 contacting the belt driving roller 14 and at a position at which the carrying belt cleaner 27 does not contact with the recording sheet P carried by the carrying belt 13.

A fixation device 28 for fixing the toner images transferred onto the recording sheets P on the recording sheets P is disposed in a direction in which the recording sheets P carried through the carrying belt 13 are cast off the belt driving roller 14 and further carried to.

Figure 2:
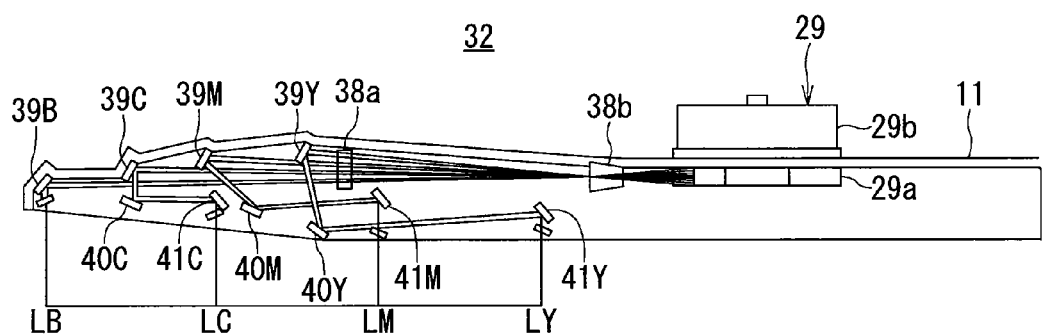
FIG. 2 is a view showing a detailed configuration of the optical beam scanning apparatus shown in FIG. 1.
Figure 3:
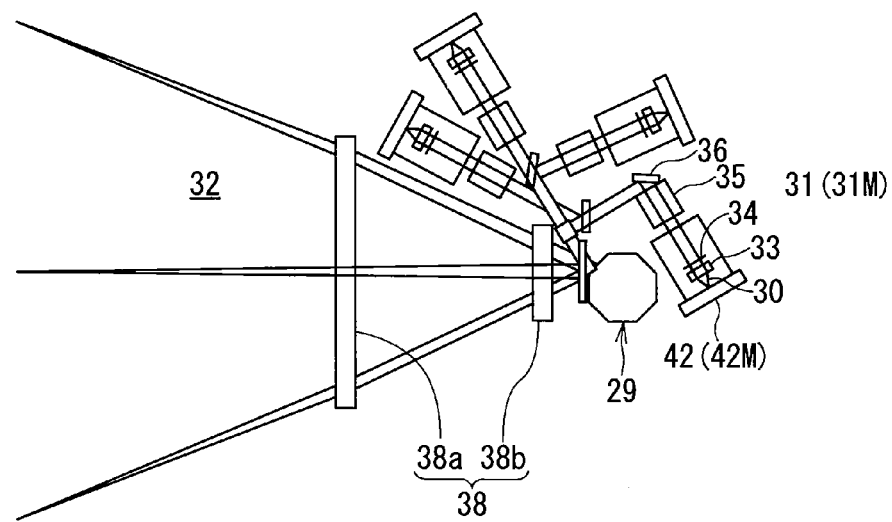
FIG. 3 is a view showing a detailed configuration of the optical beam scanning apparatus shown in FIG. 1.

FIGS. 2 and 3 show a detailed configuration of the optical beam scanning apparatus 11 shown in FIG. 1.

The optical beam scanning apparatus 11 has an optical beam deflecting device 29 including a polygonal mirror body (so-called polygon mirror) 29a having, for example, 8-plane reflecting surfaces (plane reflecting mirrors) arranged in a regular polygonal shape and a motor 29b for rotating the polygonal mirror body 29a at a predetermined speed in a main scanning direction, and light sources 30 (30Y, 30M, 30C and 30B) for emitting light beams to the first to fourth image forming parts 12 (12Y, 12M, 12C and 12B) shown in FIG. 1, respectively.

The optical beam deflecting device 29 is a deflecting means for deflecting (scanning) light beams (laser beams), which are emitted from the light sources 30 (30Y, 30M, 30C and 30B), to image planes disposed at predetermined positions (that is, outer sides of the photoconductive drums 16Y, 16M, 16C and 16B of the first to fourth image forming parts 12Y, 12M, 12C and 12B) at a predetermined linear speed. In addition, pre-deflection optical systems 31 (31Y, 31M, 31C and 31B) are disposed between the optical beam deflecting device 29 and the light sources 30 (30Y, 30M, 30C and 30B) and a post-deflection optical system 32 is disposed between the optical beam deflecting device 29 and the image planes.

A direction in which the laser beams are deflected (scanned) by the polygon mirror (the polygonal mirror body 29a shown in FIG. 3) (a rotational axial direction of the photoconductive drums 16) is defined as "main scanning direction" and a direction which is perpendicular to the optical axial direction of the optical system and the main scanning direction is defined as "sub-scanning direction". Accordingly, the sub-scanning direction is the rotational direction of the photoconductive drums 16. In addition, "image plane" indicates the outer side of the photoconductive drums 16 and "imaging plane" indicates a plane on which a light flux (laser beam) is actually imaged.

As shown in FIG. 3, the pre-deflection optical system 31 includes the light sources 30 (30Y, 30M, 30C and 30B) for respective color components, such as laser diodes, finite focusing lenses 33 (33Y, 33M, 33C and 33B) for condensing the laser beams emitted from the light sources 30 (30Y, 30M, 30C and 30B), diaphragms 34 (34Y, 34M, 34C and 34B) for giving an arbitrary section beam shape to the laser beams L that passed the finite focusing lenses 33 (33Y, 33M, 33C and 33B), and cylindrical lenses 35 (35Y, 35M, 35C and 35B) for further condensing the laser beams passed the diaphragms 34 (34Y, 34M, 34C and 34B) with respect to the sub-scanning direction, and configurates the laser beams emitted from the light sources 30 (30Y, 30M, 30C and 30B) into a predetermined section beam shape and directs them to a reflecting surface of the optical beam deflecting device 29.

A cyan laser beam LC emitted from the cylindrical lens 35C is bent in its optical path by a reflecting mirror 36C, passes through an optical path combining optical part 37, and then is guided to the reflecting surface of the optical beam deflecting device 29. A black laser beam LB emitted from the cylindrical lens 35B is bent in its optical path by a reflecting mirror 36B, is reflected by the optical path combining optical part 37, and then is guided to the reflecting surface of the optical beam deflecting device 29. A yellow laser beam LY emitted from the cylindrical lens 35Y passes over the reflecting mirror 36C, passes through the optical path combining optical part 37, and then is guided to the reflecting surface of the optical beam deflecting device 29. A magenta laser beam LM emitted from the cylindrical lens 35M is bent in its optical path by a reflecting mirror 36M, passes over the reflecting mirror 36B, is reflected by the optical path combining optical part 37, and then is guided to the reflecting surface of the optical beam deflecting device 29.

The post-deflection optical system 32 includes a pair of fθ lenses 38 (38a and 38b) as imaging lenses for optimizing shape and position of the laser beams L (Y, M, C and B), which are deflected (scanned) by the polygonal mirror body 29a, on the image planes, a horizontal synchronization sensor (not shown) for detecting the laser beams L in the order to align horizontal synchronization of the laser beams L (LY, LM, LC and LB) passed the fθ lenses 38 (38a and 38b), a horizontal synchronization reflecting mirror (not shown) for reflecting the laser beams L toward the horizontal synchronization sensor, and an optical path correcting device (not shown) disposed between the horizontal synchronization reflecting mirror and the horizontal synchronization sensor for approximately matching the laser beams L (LY, LM, LC and LB) for respective color components, which were reflected toward the horizontal synchronization sensor by the horizontal synchronization reflecting mirror, to an incident position on a detection surface of the horizontal synchronization sensor, and a plurality of post-deflection reflecting mirrors 39Y, 40Y and 41Y (yellow); 39M, 40M and 41M (magenta); 39C, 40C and 41C (cyan); and 39B (black) for directing the laser beams L (LY, LM, LC and LB) for respective color components, which were emitted from the fθ lenses 38 (38a and 38b), to corresponding photoconductive drums 16 (16Y, 16M, 16C and 16B).

However, in the conventional techniques, both of the image forming apparatus 1 as the monochrome apparatus equipped with the scanning optical system using the single light source and the image forming apparatus 1 as the tandem color apparatus using the multi-beam method have various problems when the light flux reflected on the deflecting surface of the polygon mirror is directed to the horizontal synchronization sensor.

Figure 4:
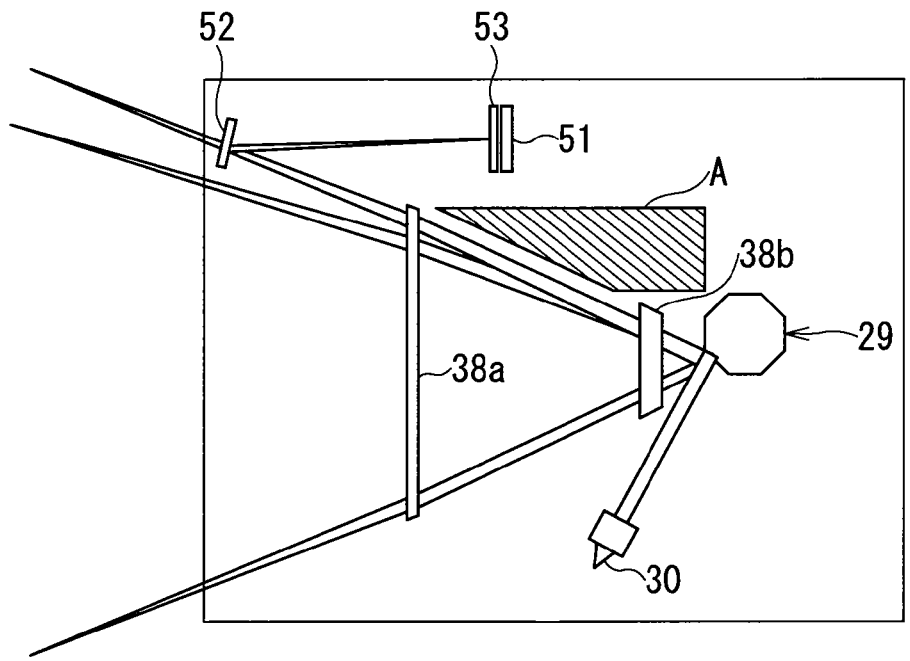
FIG. 4 is a view showing an optical path for directing a light flux to a horizontal synchronization sensor in a conventional image forming apparatus as a monochrome apparatus having a scanning optical system using a single light source.

FIG. 4 shows an optical path for directing a light flux to a horizontal synchronization sensor 51 in the conventional image forming apparatus 1 as a monochrome apparatus equipped with a scanning optical system using a single light source. As shown in FIG. 4, a portion of light flux reflected on the deflection surface of the polygonal mirror body 29a is used as a horizontal synchronization adjusting signal in the order to align a recording position of a scan optical system (that is, in the order to take a horizontal synchronization). At this time, in the order to compactly form a unit of the optical beam scanning apparatus 11 arranged with the horizontal synchronization sensor 51, a horizontal synchronization reflecting mirror 52 and, if necessary, an imaging lens 53 are arranged in the middle of the optical path when a portion of the light flux reflected on the deflecting surface of the polygonal mirror body 29a is directed to the horizontal synchronization sensor 51. However, if the horizontal synchronization sensor 51 is arranged in a shaded portion A in the order to effectively utilize a space in the optical beam scanning apparatus 11, the light flux directed to the horizontal synchronization sensor interferes with the fθ lenses 38 (38a and 38b) and so on.

Figure 5:
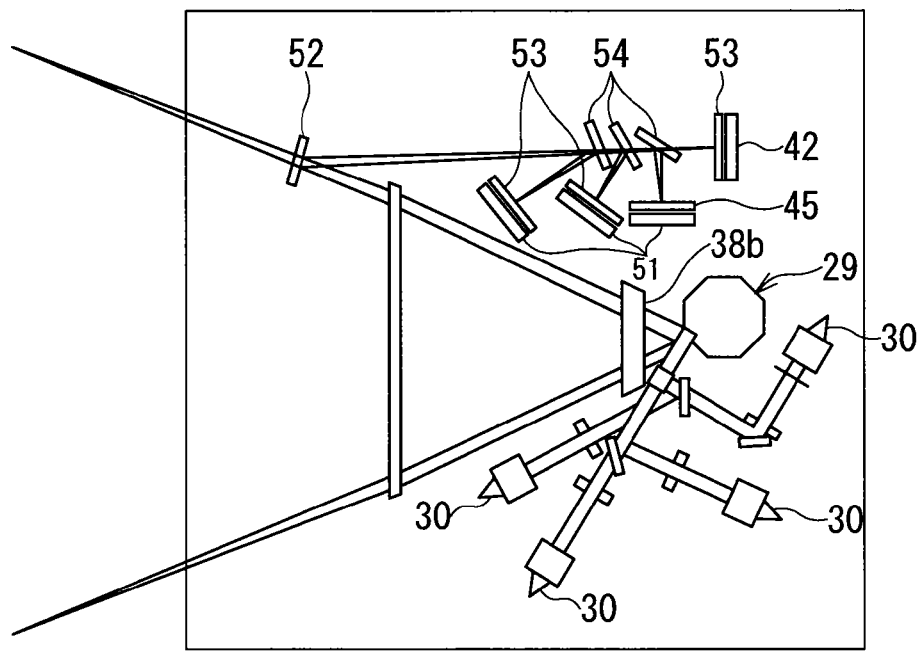
FIG. 5 is a view showing an optical path for directing a light flux to a horizontal synchronization sensor in an image forming apparatus as a tandem color apparatus using a multi-beam method.

FIG. 5 shows an optical path for directing a light flux to the horizontal synchronization sensor 51 in the image forming apparatus 1 as the tandem color apparatus using the multi-beam method. In the case of the tandem color apparatus, a plurality of light fluxes pass through the fθ lenses 38 with different heights in the sub-scanning direction. In the case of the image forming apparatus 1 as the tandem color apparatus, four light fluxes (light fluxes of Y, M, C and K) are reflected by one horizontal synchronization reflecting mirror 52, and then are reflected in the order from the bottom by separation mirrors 54 inserted between the light fluxes so as to direct to the horizontal synchronization sensor 51. However, in the tandem color apparatus, due to the presence of the reflecting mirrors (post-deflection reflecting mirrors) 39 to 41 for directing the light beams, which passed through the fθ lenses 38, to the respective photoconductive drums 16, the above configuration cannot be employed in some cases, which may result in a need to take a more complicated optical path.

Figure 6:
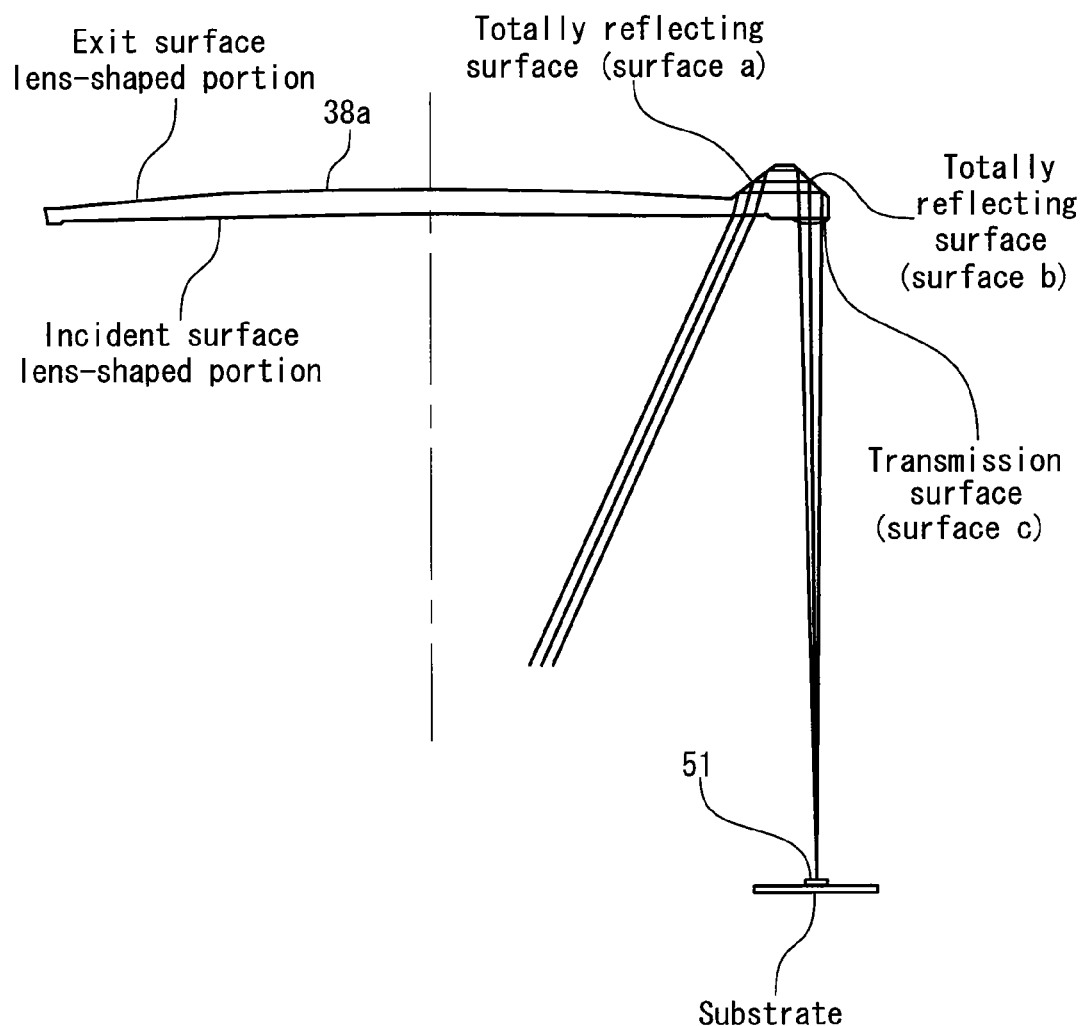
FIG. 6 is a view showing an optical path for directing a light flux to a horizontal synchronization sensor in an image forming apparatus equipped with an optical beam scanning apparatus using an fθ lens related to the present invention.

Accordingly, as shown in FIG. 6, an exit surface of the fθ lens 38a has an exit surface lens-shaped portion for directing the light flux reflected on the deflecting surface of the polygonal mirror body 29a to an imaging plane and imaging the light flux on the imaging plane, and totally reflecting surfaces (surfaces a and b) for directing a portion of the light flux reflected on the deflecting surface of the polygonal mirror body 29a to the horizontal synchronization sensor 51. On the other hand, an incident surface of the fθ lens 38a has an incident surface lens-shaped portion for transmitting the light flux reflected on the deflecting surface of the polygonal mirror body 29a. A portion of the light flux, which passed through the incident surface lens-shaped portion, of the light flux reflected on the deflecting surface of the polygonal mirror body 29a is totally reflected by the surface a as a totally reflecting surface of the fθ lens 38a and then is again totally reflected by the surface b as a totally reflecting surface as well. Then, the light flux totally reflected twice passes through a transmission surface (surface c) of the incident surface of the fθ lens 38a and is directed (guided) to the horizontal synchronization sensor 51.

Accordingly, the light flux reflected on the deflecting surface of the polygonal mirror body 29a can be directed to the horizontal synchronization sensor 51 without using a separate mirror (for example, the horizontal synchronization reflecting mirror 52 shown in FIG. 4 or 5, etc.) or a separate lens (for example, the imaging lens 53 shown in FIG. 4 or 5, etc.). Accordingly, it is possible to reduce manufacturing costs for the optical beam scanning apparatus 11 and the image forming apparatus 1 equipped with the optical beam scanning apparatus 11, thereby achieving low manufacturing costs. In addition, unlike the case in FIG. 4, since it is possible to prevent the light flux directed to the horizontal synchronization sensor from interfering with the fθ lenses 38 (38a and 38b) and so on, it is possible to arrange the horizontal synchronization sensor 51 in the shaded portion A shown in FIG. 4 and effectively utilize a space in the optical beam scanning apparatus 11, which may result in compactness of the optical beam scanning apparatus 11 and the image forming apparatus 1 equipped with the optical beam scanning apparatus 11.

Figure 7:
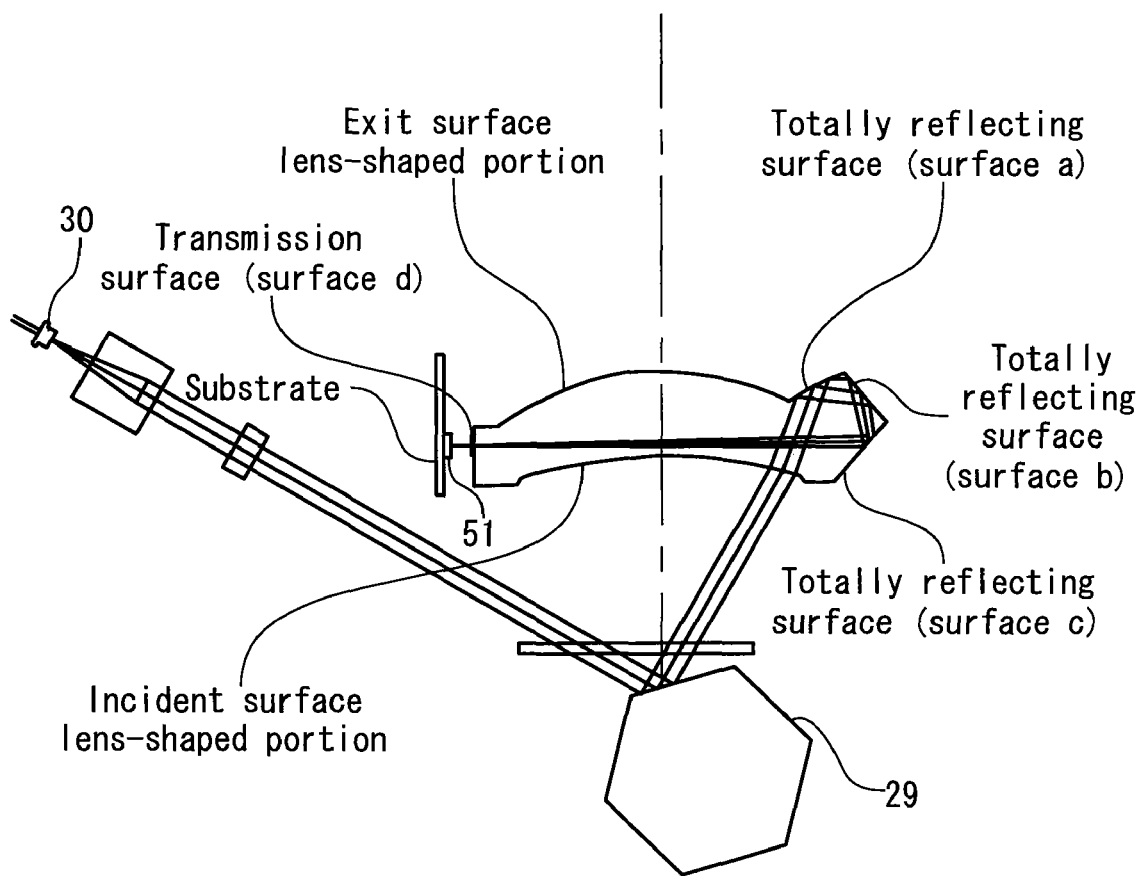
FIG. 7 is a view showing another optical path for directing a light flux to a horizontal synchronization sensor in an image forming apparatus equipped with an optical beam scanning apparatus using an fθ lens related to the present invention.

It should be noted that instead of an exit surface of the fθ lens 38a, an exit surface of the fθ lens 38b may have totally reflecting surfaces for directing a portion of the light flux reflected on the deflecting surface of the polygonal mirror body 29a to the horizontal synchronization sensor 51 In this case, as shown in FIG. 7, the exit surface of the fθ lens 38b may have the exit surface lens-shaped portion for directing the light flux reflected on the deflecting surface of the polygonal mirror body 29a to the imaging plane and imaging the light flux on the imaging plane, and three totally reflecting surfaces (surfaces a, b and c) for directing a portion of the light flux reflected on the deflecting surface of the polygonal mirror body 29a to the horizontal synchronization sensor 51, so that a portion of the light flux, which passed through the incident surface lens-shaped portion, of the light flux reflected on the deflecting surface of the polygonal mirror body 29a is totally reflected three times. Accordingly, since it is possible to easily arrange the horizontal synchronization sensor 51 in a space in which a separate mirror (for example, the horizontal synchronization reflecting mirror 52 shown in FIG. 4 or 5, etc.) or a separate lens (for example, the imaging lens 53 shown in FIG. 4 or 5, etc.) may not have been arranged, it is possible to achieve low manufacturing costs and effectively utilize a space in the optical beam scanning apparatus 11, which may result in compactness of the optical beam scanning apparatus 11 and the image forming apparatus 1 equipped with the optical beam scanning apparatus 11.

In addition, optical power may be given to at least one of the totally reflecting surfaces (surfaces for totally reflecting the light flux reflected on the deflecting surface of the polygonal mirror body 29a, including the surfaces a and b in FIG. 6 and the surfaces a, b and c in FIG. 7) and the final transmission surfaces (including a surface c in FIG. 6 and a surface d in FIG. 7) as shown in FIGS. 6 and 7. Hereinafter, the method for giving the optical power to at least one of the totally reflecting surfaces and the final transmission surfaces shown in FIGS. 6 and 7 will be described in detail.

Figure 8:
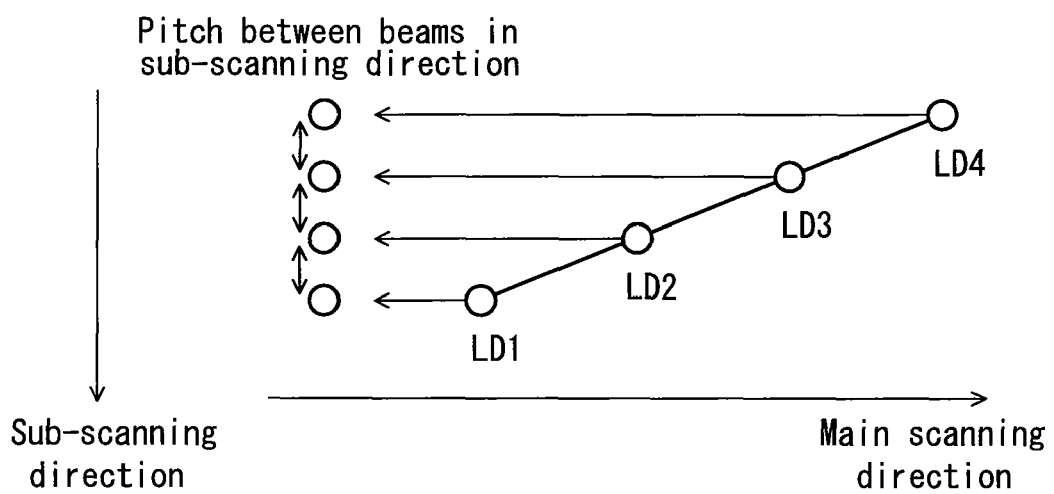
FIG. 8 is an explanatory view for explaining an arrangement of beams on an imaging surface in an optical system using a light source having a plurality of emission points.

As shown in FIG. 8, for example, in an optical system using a light source (LD array) 30 having a plurality of emission points (optical system using a multi-beam method), if a beam-to-beam pitch in a sub-scanning direction on an imaging plane (plane on which a laser beam (light flux) is actually imaged) is set to be a desired value (about 42 μm for 600 dpi and about 21 μm for 1200 dpi), the emission points have a required distance therebetween in a main scanning direction without being arranged in a row in the sub-scanning direction in view of magnification of the optical system. In other words, beam spots corresponding to the emission points are arranged in an oblique direction on an image plane (outer side of the photoconductive drums 16) on which a physical position by an axis of the sub-scanning direction and an axis of the main scanning direction appears. Accordingly, in the order to correctly align a recording position on each photoconductive drum 16, an fθ characteristic (magnification in the main scanning direction) on the horizontal synchronization sensor 51 is required to be equal to an fθ characteristic on the image plane (outer side of the photoconductive drum 16). Thus, the optical power is given to at least one of the totally reflecting surfaces (surfaces for totally reflecting the light flux reflected on the deflecting surface of the polygonal mirror body 29a) and the final transmission surfaces such that the fθ characteristic on the horizontal synchronization sensor 51 becomes equal to the fθ characteristic on the image plane. In addition, since a too large beam diameter of a beam spot of a laser beam formed on the horizontal synchronization sensor 51 may cause an error, it is preferable to make a beam diameter on the horizontal synchronization sensor 51 equal to an beam diameter on the image plane (outer side of the photoconductive drum 16). Accordingly, since it is possible to easily arrange the horizontal synchronization sensor 51 in a space in which a separate mirror or a separate lens may not have been arranged, it is possible to achieve low manufacturing costs and effectively utilize a space in the optical beam scanning apparatus 11, which may result in compactness of the optical beam scanning apparatus 11 and the image forming apparatus 1 equipped with the optical beam scanning apparatus 11 as well as correct and suitable alignment of the recording position on the photoconductive drums 16.

Figure 9:
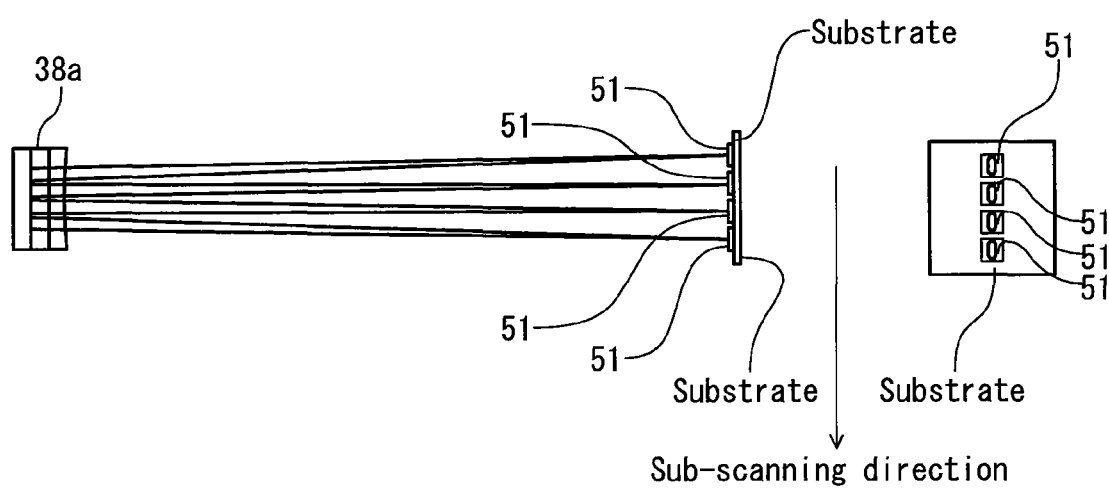
FIG. 9 is a view showing an arrangement of horizontal synchronization sensors provided on a substrate.

Next, in the case of the image forming apparatus 1 as the tandem color apparatus using the multi-beam method, a plurality of light fluxes 30 pass through fθ lenses 38 (imaging lenses) in a plurality of light sources 30 and a plurality of pre-deflection optical systems with different heights in a sub-scanning direction. In this case, a maximum of four light fluxes (light fluxes of YMCK) is totally reflected, and then are reflected in the order from the bottom by separation mirrors 53 (inserted between the light beams) shown in FIG. 5 so as to direct to four substrates on which a single horizontal synchronization sensor 51 is mounted. However, in the case of FIG. 6 or 7 in which the light flux is directed to the horizontal synchronization sensor 51 using the totally reflecting surfaces, for example as shown in FIG. 9, it may be contemplated that four horizontal synchronization sensors 51 are arranged on a single substrate. FIG. 9 is a sectional view showing an optical path for directing the light flux to the horizontal synchronization sensors 51. In this case, there is a possibility that an interval between centers of the horizontal synchronization sensors 51 becomes wider than an interval between beams for respective colors in the sub-scanning direction on the imaging plane. Thus, optical power is given to at least one of the totally reflecting surfaces (surfaces for totally reflecting the light flux reflected on the deflecting surface of the polygonal mirror body 29a) and the final transmission surfaces so as to adjust a difference between the interval between beams for respective colors in the sub-scanning direction on the imaging plane and the interval between centers of the horizontal synchronization sensors 51. Accordingly, even when the four horizontal synchronization sensors 51 are arranged on the single substrate, the totally-reflected light flux can be properly directed to the horizontal synchronization sensors 51. In addition, if there is a width by which light fluxes can be separated from each other in the sub-scanning direction, the totally reflecting surfaces or the final transmission surfaces may be configured in a multi-stage in the sub-scanning direction, and reflection angles or optical powers may be individually set.

Figure 10:
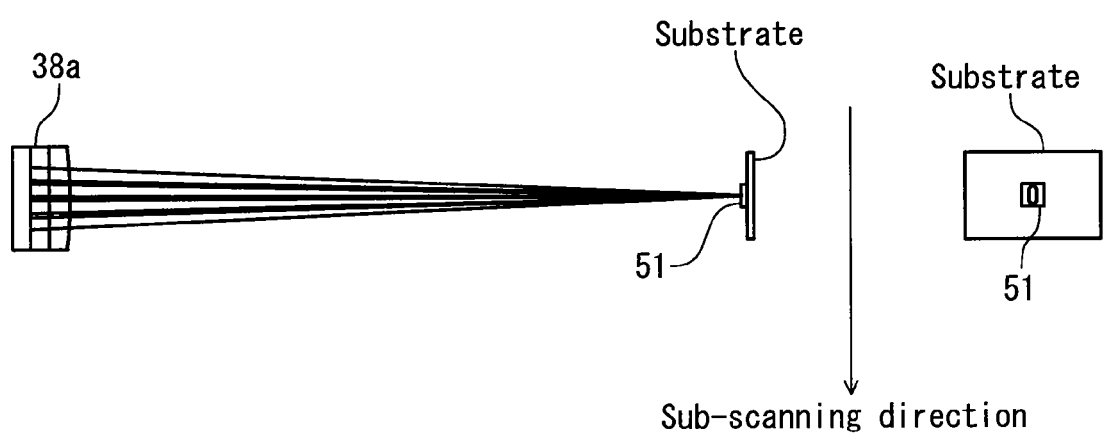
FIG. 10 is a view showing another arrangement of horizontal synchronization sensors provided on a substrate.

Contrary to the case in FIG. 9, for example as shown in FIG. 10, four light fluxes may share a single horizontal synchronization sensor 51. FIG. 10 is a sectional view showing an optical path for directing the light fluxes to the horizontal synchronization sensor 51, like FIG. 9. In this case, optical power is given to at least one of the totally reflecting surfaces (surfaces for totally reflecting the light flux reflected on the deflecting surface of the polygonal mirror body 29a) and the final transmission surfaces such that the four light fluxes are incident on the single horizontal synchronization sensor 51 arranged on a single substrate. Accordingly, since a recording position can be adjusted by the single horizontal synchronization sensor 51 even when the multi-beam method is used, it is possible to reduce manufacturing costs for the optical beam scanning apparatus 11 and the image forming apparatus 1 equipped with the optical beam scanning apparatus 11, thereby achieving low manufacturing costs. In addition, the optical beam scanning apparatus 11 and the image forming apparatus 1 equipped with the optical beam scanning apparatus 11 can be compactly formed. In addition, if there is a width by which the light fluxes can be separated from each other in the sub-scanning direction, the totally reflecting surfaces or the final transmission surfaces may be configured in a multi-stage in the sub-scanning direction, and reflection angles or optical powers may be individually set.

Figure 11:
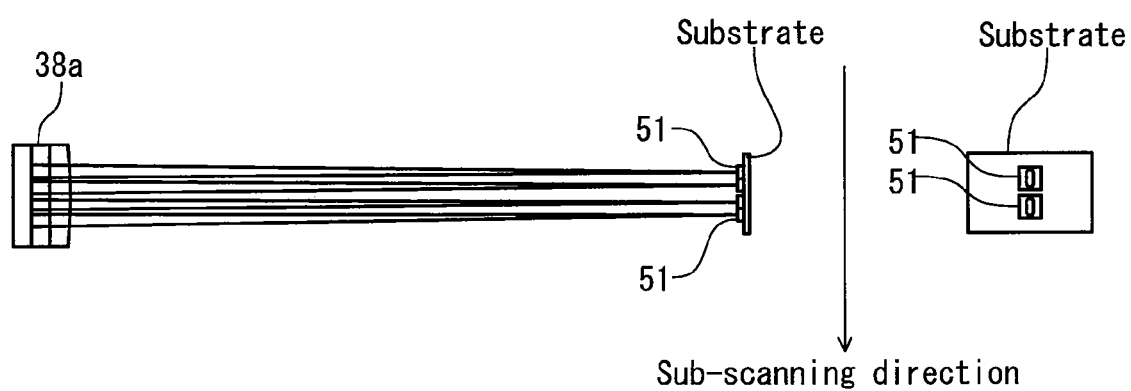
FIG. 11 is a view showing still another arrangement of horizontal synchronization sensors provided on a substrate.

In addition, as shown in FIG. 11, four light fluxes may be assigned to and share fewer (for example, two) horizontal synchronization sensors 51. FIG. 11 is a sectional view showing an optical path for directing the light fluxes to the horizontal synchronization sensor 51, like FIG. 9. In this case, optical power is given to at least one of the totally reflecting surfaces (surfaces for totally reflecting the light flux reflected on the deflecting surface of the polygonal mirror body 29a) and the final transmission surfaces such that the four light fluxes are assigned to and incident on a plurality of horizontal synchronization sensors 51 arranged on a single substrate. Accordingly, since a recording position can be adjusted by the horizontal synchronization sensors 51 fewer than the light fluxes even when the multi-beam method is used, it is possible to reduce the number of parts and manufacturing costs for the optical beam scanning apparatus 11 and the image forming apparatus 1 equipped with the optical beam scanning apparatus 11, thereby achieving low manufacturing costs. In addition, since a space can be saved, the optical beam scanning apparatus 11 and the image forming apparatus 1 equipped with the optical beam scanning apparatus 11 can be compactly formed. In addition, if there is a width by which the light fluxes can be separated from each other in the sub-scanning direction, the totally reflecting surfaces or the final transmission surfaces may be configured in a multi-stage in the sub-scanning direction, and reflection angles or optical powers may be individually set.

Figure 12:
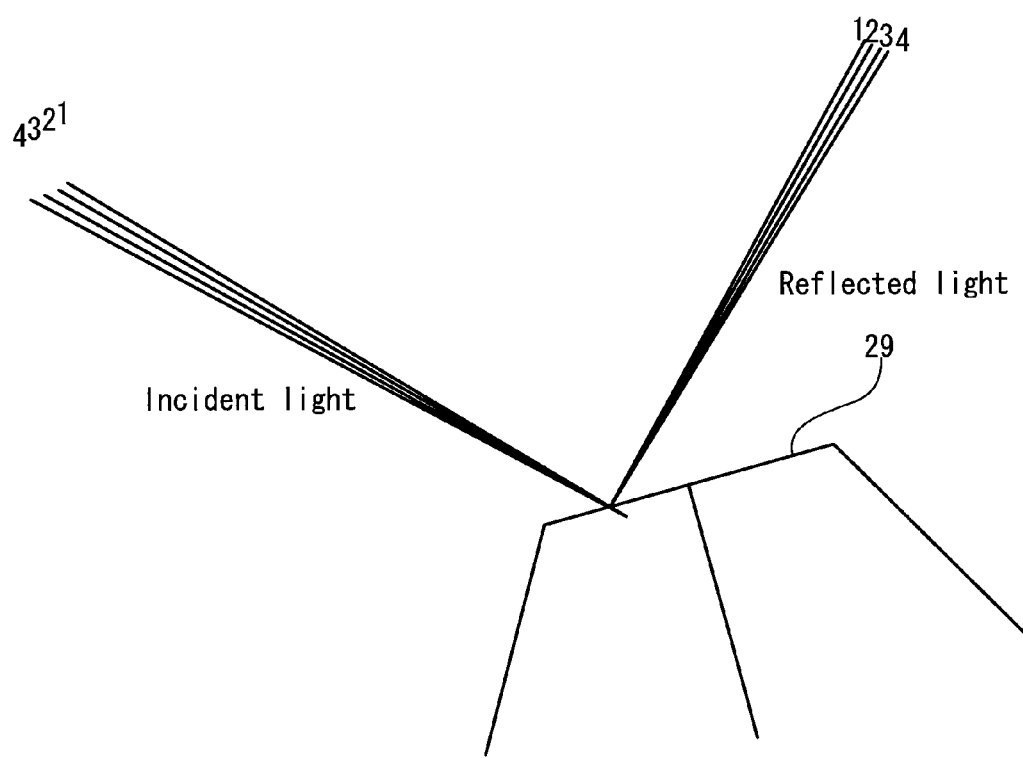
FIG. 12 is an explanatory view for explaining a method of changing an angle at which a light flux from an pre-deflection optical system is incident on a deflecting surface of a polygon mirror of an optical beam deflecting device.

When the plurality of light fluxes share the single horizontal synchronization sensor 51 as in the cases of FIGS. 10 and 11, the plurality of light fluxes are almost simultaneously incident on the horizontal synchronization sensor 51, which may result in overlap of detection signals. Thus, as shown in FIG. 12, an incident angle of the light fluxes from a pre-deflection optical system on the deflecting surface of the polygonal mirror body 29a of the optical beam deflecting device 29 is slightly altered so as to change a timing at which the light fluxes are incident on the horizontal synchronization sensor 51. This makes it possible to prevent the plurality of light fluxes from being simultaneously incident on the single horizontal synchronization sensor 51.

Figure 13:
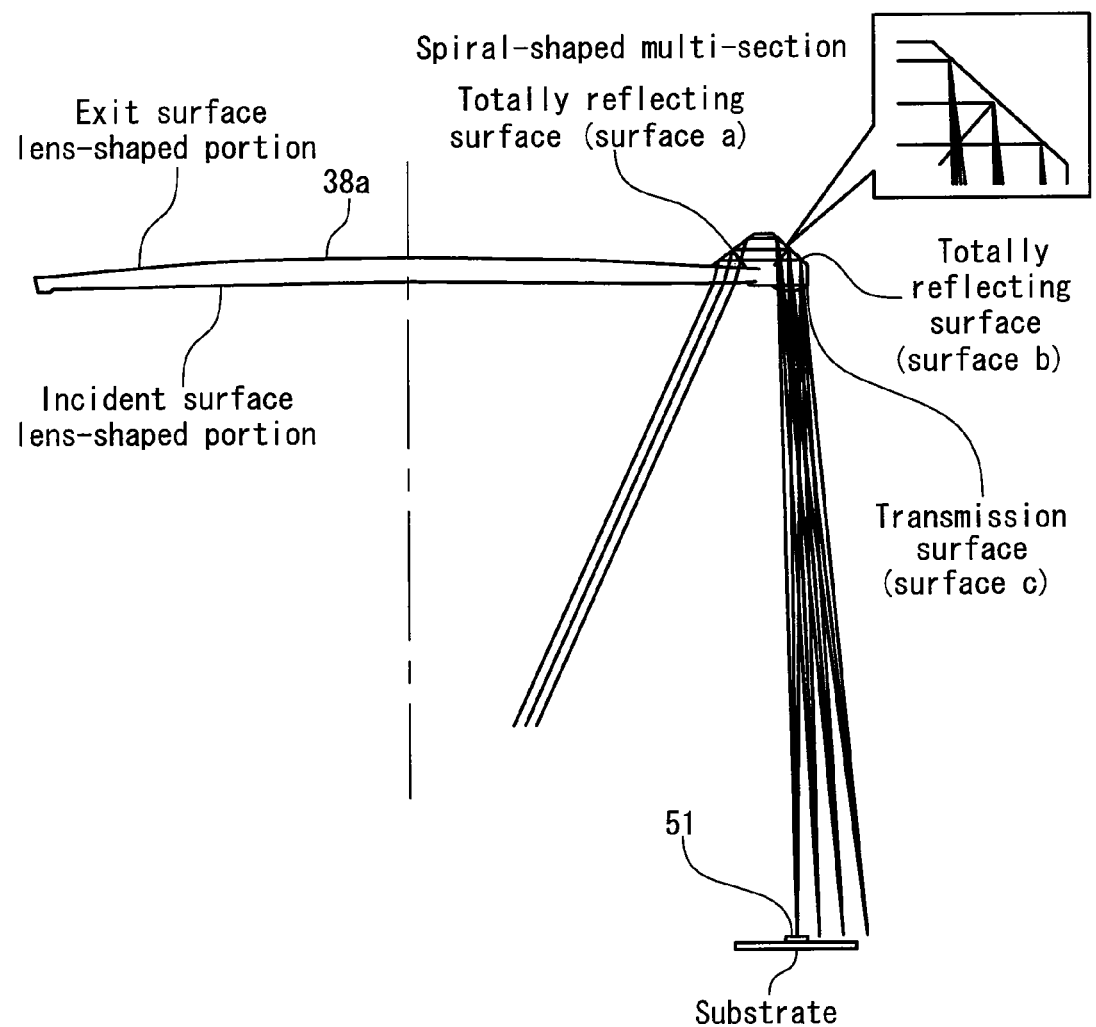
FIG. 13 is an explanatory view for explaining another method of changing an angle at which a light flux from an pre-deflection optical system is incident on a deflecting surface of a polygon mirror of an optical beam deflecting device.

As an alternate, at least one of the totally reflecting surfaces (surfaces for totally reflecting the light flux reflected on the deflecting surface of the polygonal mirror body 29a) and the final transmission surfaces may be set to have a shape to change a timing at which the light fluxes are incident on the horizontal synchronization sensor 51. For example, as shown in FIG. 13, the second totally reflecting surface (surface b) is set to have a spiral-shaped multi-section in the main scanning direction and a reflection angle may be little by little altered in the main scanning direction so as to change a timing at which the light fluxes are incident on the horizontal synchronization sensor 51. A totally reflecting surface (for example, surface b or the like) can be set to have a multi-section when there is a spacing by which a plurality of light fluxes (laser beams) can be separated from each other in the sub-scanning direction. In the absence of such a spacing, the same effect can be obtained by forming the totally reflecting surface on a free curved surface obtained by generally smoothly modifying a spiral shape.

Figure 14:
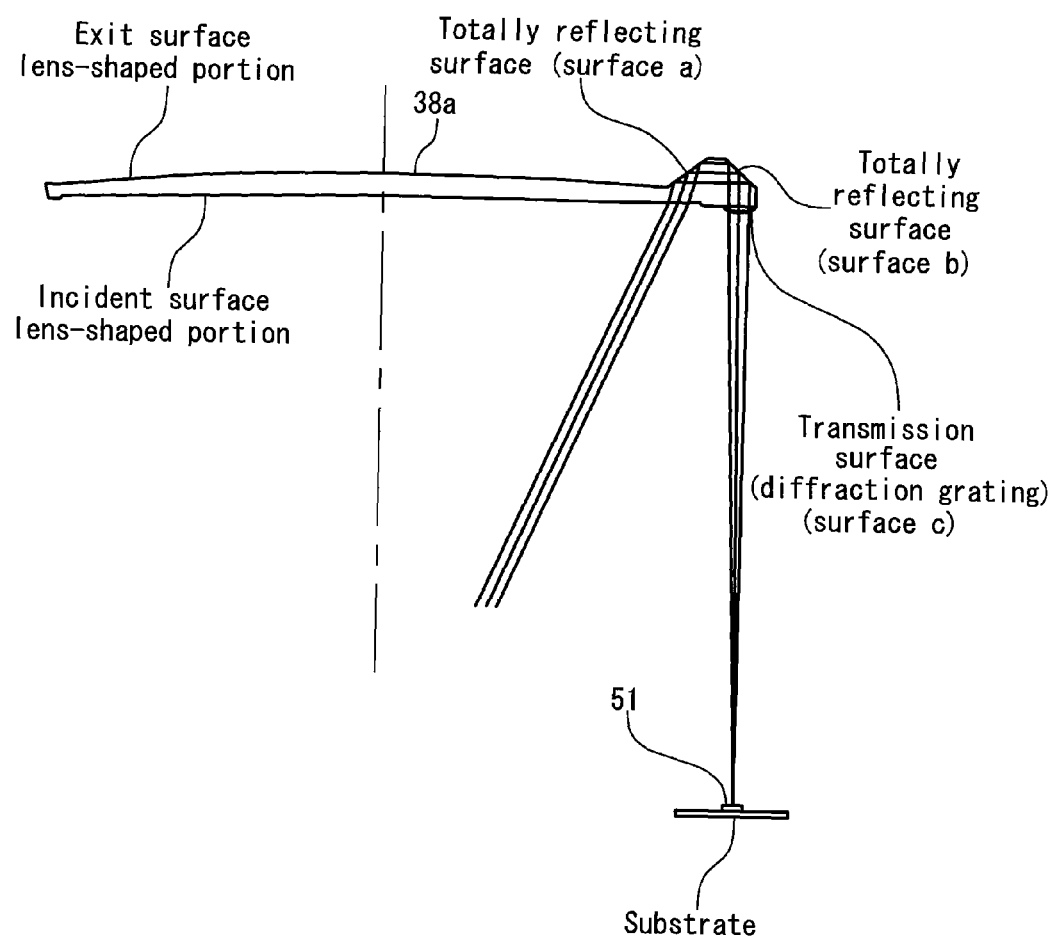
FIG. 14 is an explanatory view for explaining a face of a diffraction grating provided on a final transmission surface.

As another alternate, as shown in FIG. 14, a surface having a diffraction grating may be arranged on the final transmission surface (surface c) after the total reflection. This diffraction grating is arranged for temperature compensation in the main scanning direction. In other words, although the light fluxes reflected on the deflecting surface of the polygonal mirror body 29a pass through a common incident surface of the fθ lens 38a, reflected on the totally reflecting surfaces (surfaces a and b, etc.), and then pass through the final transmission surface (surface c) so as to direct to the horizontal synchronization sensor 51, if temperature increases over initial temperature, the light fluxes (laser beams) being directed to the horizontal synchronization sensor 51 are deviated in the main scanning direction. Thus, by arranging the surface having the diffraction grating on the final transmission surface (surface c), it is possible to compensate for the deviation in the main scanning direction, which is caused by the increase of temperature, and accordingly it is possible to form a stable image without deviation of a recording position of an image on the photoconductive drums 16 even if the temperature increases. The final transmission surface (surface c) may be a surface having a diffraction grating and an optical power (curvature). In addition, when the surface having the diffraction grating is arranged on the final transmission surface (surface c), deviation caused by increase of temperature not only in the main scanning direction but also in the sub-scanning direction may be compensated for.

What is claimed is:
1. An optical beam scanning apparatus comprising:
a light source configured to emit one or plural light fluxes;
a pre-deflection optical system configured to give a predetermined characteristic to the light flux emitted from the light source;
an optical beam deflecting device configured to deflect the light flux, which is given with the predetermined characteristic by the pre-deflection optical system, to a scanned object in a main scanning direction;
a sensor configured to detect a portion of the light flux deflected by the optical beam deflecting device; and a post-deflection optical system including an imaging lens for imaging the light flux, which is deflected by the optical beam deflecting device, on the scanned object, the imaging lens having:
   a lens-shaped portion for imaging the light flux, which is deflected by a deflecting surface of the optical beam deflecting device and passed through an incidence surface of the imaging lens, onto a scanned surface of the scanned object,
   a totally reflecting surface-shaped portion having at least two totally reflecting surfaces for totally reflecting a part of the light flux, which is deflected from the deflecting surface of the optical beam deflecting device and passed through the incident surface of the imaging lens, the part of the light flux being totally reflected at least two times on the totally reflecting surfaces, and
   a transmission surface-shaped portion that has a transmission surface through which the part of the light flux, which is totally reflected by the totally reflecting surfaces, is transmitted, the part of the light flux transmitted through the transmission surface being directed to the sensor.

2. The optical beam scanning apparatus according to claim 1, wherein an optical power is configured to be given to at least one of the totally reflecting surface of the totally reflecting surface-shaped portion and the transmission surface of the transmission surface-shaped portion.

3. The optical beam scanning apparatus according to claim 2, wherein the optical power given to at least one of the totally reflecting surface of the totally reflecting surface-shaped portion and the transmission surface of the transmission surface-shaped portion is configured to be set such that an fθ characteristic on the scanned surface of the scanned object is equal to an fθ characteristic on the sensor surface.

4. The optical beam scanning apparatus according to claim 2, wherein the optical power given to at least one of the totally reflecting surface of the totally reflecting surface-shaped portion and the transmission surface of the transmission surface-shaped portion is configured to be set such that a beam diameter on the scanned surface of the scanned object is equal to a beam diameter on the sensor surface.

5. The optical beam scanning apparatus according to claim 2, wherein an optical system of the optical beam scanning apparatus is configured to be an optical system that transmits a plurality of light fluxes with different heights to the imaging lens in a sub-scanning direction, a plurality of sensors of the same number as the light fluxes are configured to be arranged with predetermined intervals in the sub-scanning direction on a same substrate, and the optical power given to at least one of the totally reflecting surface of the totally reflecting surface-shaped portion and the transmission surface of the transmission surface-shaped portion is configured to be set such that the plurality of light fluxes from the deflecting surface of the optical beam deflecting device is directed to the respective sensors.

6. The optical beam scanning apparatus according to claim 5, wherein at least one of the totally reflecting surface of the totally reflecting surface-shaped portion and the transmission surface of the transmission surface-shaped portion is configured to have a multi-stage shape in the sub-scanning direction, and a reflection angle or an optical power is configured to be individually set.

7. The optical beam scanning apparatus according to claim 2, wherein an optical system of the optical beam scanning apparatus is configured to be an optical system that transmits a plurality of light fluxes with different heights to the imaging lens in a sub-scanning direction, the sensors of the number fewer than the light fluxes are arranged with predetermined intervals in the sub-scanning direction on a same substrate, and the optical power given to at least one of the totally reflecting surface of the totally reflecting surface-shaped portion and the transmission surface of the transmission surface-shaped portion is configured to be set such that the plurality of light fluxes from the deflecting surface of the optical beam deflecting device are each selectively assigned to and directed to any of the sensors.

8. The optical beam scanning apparatus according to claim 2, wherein an optical system of the optical beam scanning apparatus is configured to be an optical system that transmits a plurality of light fluxes with different heights to the imaging lens in a sub-scanning direction, one sensor is arranged on a substrate, and the optical power given to at least one of the totally reflecting surface of the totally reflecting surface-shaped portion and the transmission surface of the transmission surface-shaped portion is configured to be set such that the plurality of light fluxes from the deflecting surface of the optical beam deflecting device is directed to the same sensor.

9. The optical beam scanning apparatus according to claim 8, wherein an incident angle of the light flux from the pre-deflection optical system on the deflecting surface of the optical beam deflecting device is configured to be altered.

10. The optical beam scanning apparatus according to claim 8, wherein at least one of the totally reflecting surface of the totally reflecting surface-shaped portion and the transmission surface of the transmission surface-shaped portion is configured to have a shape to change a timing at which the light flux is incident on the sensor, or is configured to be set such that an optical power changes the timing at which the light flux is incident on the sensor.

11. The optical beam scanning apparatus according to claim 10, wherein at least one of the totally reflecting surface of the totally reflecting surface-shaped portion and the transmission surface of the transmission surface-shaped portion is configured to have a spiral-shaped multi-stage shape in the sub-scanning direction.

12. The optical beam scanning apparatus according to claim 10, wherein at least one of the totally reflecting surface of the totally reflecting surface-shaped portion and the transmission surface of the transmission surface-shaped portion is configured to have a spiral-shaped free curved surface shape.

13. The optical beam scanning apparatus according to claim 1, wherein a diffraction grating surface is configured to be additionally arranged on the transmission surface of the transmission surface-shaped portion.

14. The optical beam scanning apparatus according to claim 13, wherein a diffraction grating surface for compensating for deviation of the light fluxes directing to the sensor is configured to be additionally arranged on the transmission surface of the transmission surface-shaped portion in at least one of the main scanning direction and the sub-scanning direction.

15. An image forming apparatus having an optical beam scanning apparatus comprising:
   a light source configured to emit one or plural light fluxes;
   a pre-deflection optical system configured to give a predetermined characteristic to the light flux emitted from the light source;
   an optical beam deflecting device configured to deflect the light flux, which is given with the predetermined characteristic by the pre-deflection optical system, to a scanned object in a main scanning direction;
   a sensor configured to detect a portion of the light flux deflected by the optical beam deflecting device; and a post-deflection optical system including an imaging lens for imaging the light flux, which is deflected by the optical beam deflecting device, on the scanned object, the imaging lens having:
- a lens-shaped portion for imaging the light flux, which is deflected by a deflecting surface of the optical beam deflecting device and passed through an incidence surface of the imaging lens, onto a scanned surface of the scanned object,
- a totally reflecting surface-shaped portion having at least two totally reflecting surfaces for totally reflecting a part of the light flux, which is deflected from the deflecting surface of the optical beam deflecting device and passed through the incident surface of the imaging lens, the part of the light flux being totally reflected at least two times on the totally reflecting surfaces, and
- a transmission surface-shaped portion that has a transmission surface through which the part of the light flux, which is totally reflected by the totally reflecting surfaces, is transmitted, the part of the light flux transmitted through the transmission surface being directed to the sensor.

* * * * *